(12) United States Patent
Shimazaki et al.

(10) Patent No.: US 7,352,658 B2
(45) Date of Patent: Apr. 1, 2008

(54) METHOD FOR RECORDING INFORMATION DATA TO A RECORDING MEDIUM BY IRRADIATION WITH A LIGHT BEAM AND APPLICATION OF A MAGNETIC FIELD

(75) Inventors: Katsusuke Shimazaki, Toride (JP); Norio Ohta, Yawara-mura (JP); Fumiyoshi Kirino, Suginami-ku (JP)

(73) Assignee: Hitachi Maxell, Ltd., Osaka (JP)

( * ) Notice: Subject to any disclaimer, the term of this patent is extended or adjusted under 35 U.S.C. 154(b) by 221 days.

(21) Appl. No.: 10/381,315

(22) PCT Filed: Feb. 7, 2001

(86) PCT No.: PCT/JP01/00857

§ 371 (c)(1),
(2), (4) Date: Mar. 25, 2003

(87) PCT Pub. No.: WO02/27713

PCT Pub. Date: Apr. 4, 2002

(65) Prior Publication Data

US 2003/0179658 A1    Sep. 25, 2003

(30) Foreign Application Priority Data

Sep. 25, 2000 (JP) ............................. 2000-290498

(51) Int. Cl.
*G11B 11/00* (2006.01)
(52) U.S. Cl. .................................. 369/13.06
(58) Field of Classification Search ............ 369/13.06, 369/13.07, 13.08, 13.09, 13.41, 13.42; 428/694 ML, 428/694 MM; 360/59
See application file for complete search history.

(56) References Cited

U.S. PATENT DOCUMENTS

| | | | |
|---|---|---|---|
| 4,652,499 A | | 3/1987 | Howard |
| 5,051,970 A | | 9/1991 | Ishii et al. |
| 5,241,520 A | * | 8/1993 | Ohta et al. ............... 369/13.42 |
| 5,616,428 A | * | 4/1997 | Nishimura et al. ...... 360/13.42 |
| 5,889,739 A | * | 3/1999 | Nishimura et al. ...... 369/13.07 |
| 5,909,410 A | * | 6/1999 | Awano et al. ............ 369/13.07 |
| 5,935,701 A | * | 8/1999 | Nishimura ................... 428/332 |

(Continued)

FOREIGN PATENT DOCUMENTS

JP          A 57-69542          4/1982

(Continued)

*Primary Examiner*—Tan Dinh
(74) *Attorney, Agent, or Firm*—Oliff & Berridge, PLC

(57) ABSTRACT

A magnetic recording medium comprises a first magnetic film and a second magnetic film on a substrate. The second magnetic film is composed of a magnetic material preferred for recording and reproduction, and the first magnetic film is composed of a ferrimagnetic material excellent in thermal stability. Information is recorded in the second magnetic film by using a magnetic head. The first magnetic film is heated by being irradiated with a laser beam to lower coercivity, and the information in the second magnetic film is magnetically transferred to the first magnetic film. The recorded information is stabilized, because the first magnetic film is excellent in thermal stability. The magnetic recording medium is highly resistant to thermal fluctuation, and it has high reliability. A magnetic domain of about 0.1 μm, formed by magnetic recording at a super high density of 50 Gb/inch$^2$, is successfully and stably allowed to exist.

17 Claims, 9 Drawing Sheets

U.S. PATENT DOCUMENTS

| | | | |
|---|---|---|---|
| 6,018,511 A * | 1/2000 | Nishikiori et al. | 369/13.49 |
| 6,266,299 B1 * | 7/2001 | Oshima et al. | 369/13.38 |
| 6,307,816 B1 * | 10/2001 | Nishimura | 369/13.07 |
| 6,455,174 B1 * | 9/2002 | Takao et al. | 369/275.2 |
| 6,504,797 B1 * | 1/2003 | Murakami et al. | 369/13.3 |
| 6,519,211 B1 * | 2/2003 | Murakami et al. | 369/13.08 |
| 6,633,514 B1 * | 10/2003 | Awano et al. | 369/13.28 |
| 6,826,131 B2 * | 11/2004 | Kawaguchi et al. | 369/13.07 |

FOREIGN PATENT DOCUMENTS

| | | |
|---|---|---|
| JP | A 58-57645 | 4/1983 |
| JP | A 3-189905 | 8/1991 |
| JP | A 8-273224 | 10/1996 |
| JP | A 2000-207702 | 7/2000 |
| JP | A 2000-215402 | 8/2000 |

* cited by examiner

1 SUBSTRATE

2 FERRIMAGNETIC FILM

3 NON-MAGNETIC INTERMEDIATE FILM

4 INFORMATION-RECORDING FILM

5 PROTECTIVE FILM

Fig. 2
(A)
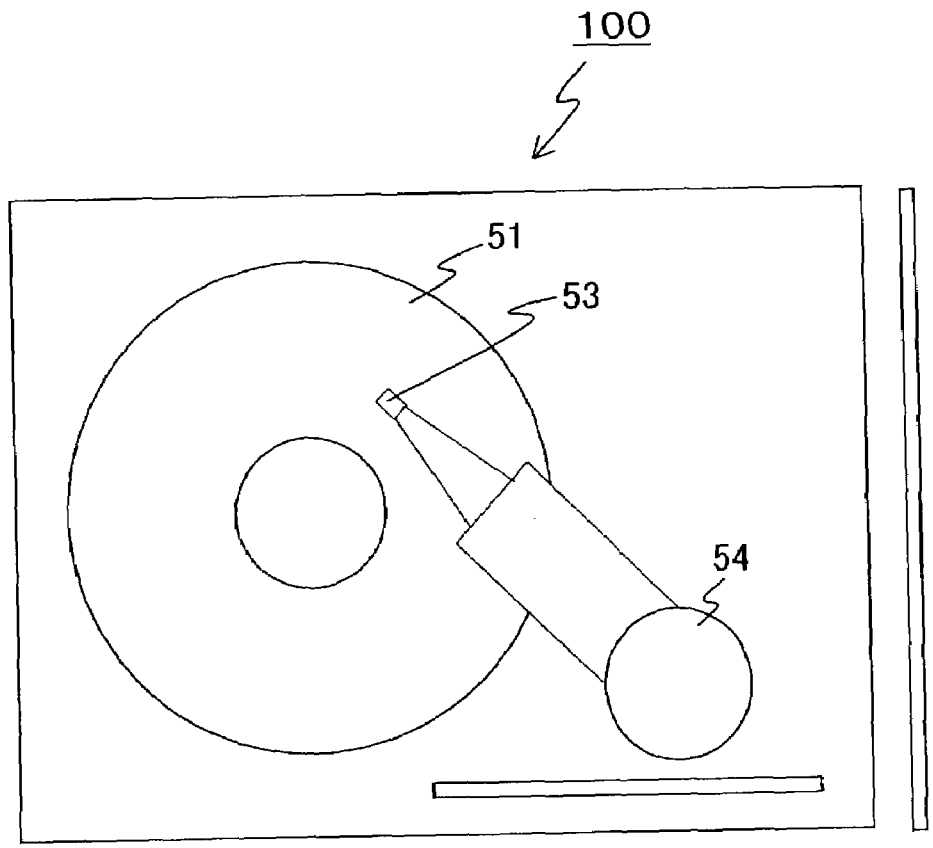
(B)
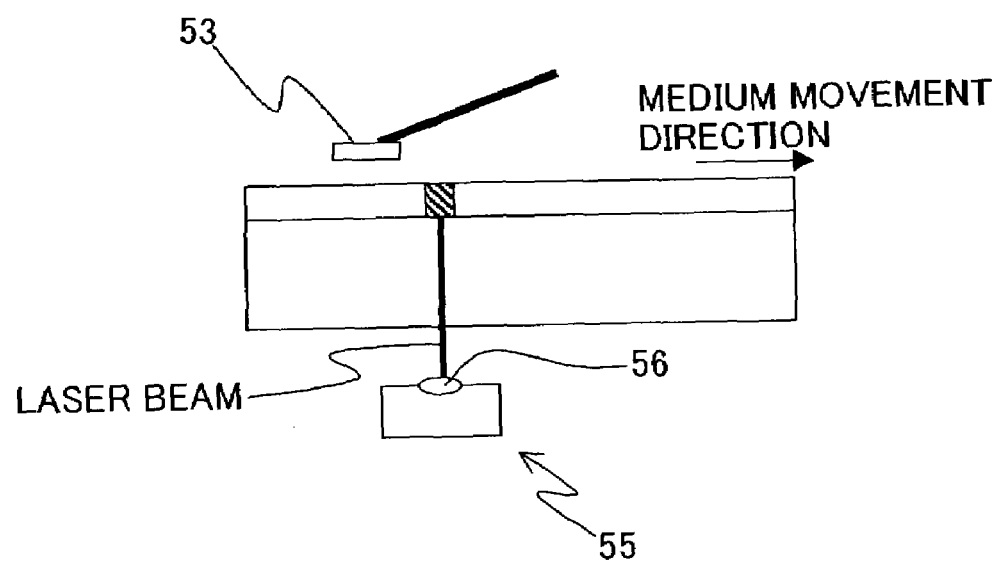

METHOD FOR RECORDING INFORMATION DATA TO A RECORDING MEDIUM BY IRRADIATION WITH A LIGHT BEAM AND APPLICATION OF A MAGNETIC FIELD

This application is a 371 of PCT/JP01/00857 Dec. 17, 2001

TECHNICAL FIELD

The present invention relates to an information-recording medium for super high density recording comprising at least two layers of magnetic films, an information-recording apparatus, and a recording method. In particular, the present invention relates to an information-recording medium on which information is recorded at a high density by means of irradiation with a light beam and application of a magnetic field, an information-recording apparatus, and a recording method which is preferably usable for high density recording.

BACKGROUND ART

Progress of the advanced information society is remarkable in recent years. The multimedia, with which various forms of information can be handled, are rapidly popularized. A magnetic recording apparatus, which is installed to a computer or the like, is known as one of the multimedia. At present, the development is advanced in order that the magnetic recording apparatus is miniaturized while improving the recording density.

In order to realize the high density recording by the magnetic recording apparatus, for example, it is demanded that (1) the distance between the magnetic disk and the magnetic head is narrowed, (2), the coercivity of the magnetic recording medium is increased, (3) the method for processing the signal is executed at a high speed, and (4) a medium, which suffers from less thermal fluctuation, is developed.

In order to realize the high density recording especially at a surface recording density exceeding 50 Gbits/inch$^2$ (about 7.75 Gbits/cm$^2$), it is necessary that the unit (magnetic cluster), in which the magnetization reversal occurs in the magnetic layer during the recording and the erasing, is further decreased, and the distribution thereof is precisely controlled. In order to decrease the magnetic cluster, it is necessary that the crystal grains, which constitute the magnetic layer, are made fine and minute, or the number of crystal grains for constituting the magnetic cluster is decreased.

In view of the reduction of the thermal fluctuation, it is also important to reduce the dispersion of grain diameters when the crystal grains are made fine and minute. The thermal fluctuation tends to occur in the case of the minute crystal grains. Therefore, it is necessary that the crystal grain diameters are controlled to be not less than a certain size. However, if the crystal grain diameters are unnecessarily increased, and the crystal grains become coarse, then the noise increases in some cases when information recorded at a high density is reproduced. Therefore, it has been necessary to strictly control the grain sizes of the crystal grains and the distribution thereof. As a trial to realize the above, it has been suggested to provide a seed film between a substrate and a magnetic layer as disclosed, for example, in U.S. Pat. No. 4,652,499.

However, the method, in which the magnetic layer is provided on the substrate with the seed film intervening therebetween, has had a limit to control the crystal grain diameters and the distribution thereof in the magnetic layer. It has been difficult to sufficiently suppress the noise and the thermal fluctuation generated from the medium, for example, even when information is recorded at a recording density exceeding 50 Gbits/inch$^2$ (about 7.75 Gbits/cm$^2$).

For example, even when the material for the seed film, the film formation condition, and the structure of the seed film are adjusted in order to obtain crystal grains of the magnetic layer having grain diameters of about 10 nm, the grain diameter distribution of the obtained crystal grains is a Gaussian distribution having wide lower slopes, in which coarse grains having about double sizes of 10 nm and minute grains inversely having about half sizes of 10 nm are considerably present in a mixed manner. The crystal grains, which have grain diameters larger than the average of those of the crystal grains, cause the increase of noise during the recording/reproduction. On the other hand, the crystal grains, which have grain diameters smaller than the average, increase the thermal fluctuation during the recording/reproduction.

In order to suppress the occurrence of the thermal fluctuation as described above and allow the minute crystal grains to exist stably, it is enough that the coercivity of the magnetic layer is raised. However, if the coercivity of the magnetic layer is raised, it is necessary to strengthen the magnetic field to be generated by the magnetic head. In such a situation, it has been difficult to record information by using the existing magnetic head in some cases. Accordingly, a method has been suggested, in which the magnetic layer is heated by irradiation with a light beam to temporarily lower the coercivity during the recording of information, and the information is recorded by applying the magnetic field to an area in which the coercivity has been lowered. Such a recording system is called "thermal assist magnetic recording". Even in the case of the magnetic recording medium in which the coercivity of the magnetic layer is enhanced, information can be recorded even when the existing magnetic head is used, because the coercivity of the recording layer is decreased by effecting the heating by means of the irradiation with the light beam during the recording of information. However, in the case of the thermal assist magnetic recording system, it is necessary that the area which is irradiated with the light beam and the area to which the magnetic field is applied are correctly coincident with each other. Therefore, it is necessary to position the magnetic head and the optical head highly accurately. As a result, a problem arises such that the structure of the recording head is complicated and the production cost is expensive.

The present invention has been made taking the foregoing circumstances into consideration. A first object of the present invention is to provide a novel recording method for recording information at a super high density on an information-recording medium.

A second object of the present invention is to provide an information-recording apparatus which is excellent in thermal stability and which has high reliability.

A third object of the present invention is to provide an information-recording medium which makes it possible to record information at a super high recording density of not less than 50 Gbits/inch$^2$ (about 7.75 Gbits/cm$^2$) in a magnetic film for information recording.

DISCLOSURE OF THE INVENTION

According to a first aspect of the present invention, there is provided a recording method for an information-recording medium comprising a first magnetic film and a second magnetic film, the recording method comprising:

applying a magnetic field to the information-recording medium to record information in the second magnetic film, and irradiating, with a laser beam, an area in which the information has been recorded to magnetically transfer the information recorded in the second magnetic film to the first magnetic film.

In the recording method of the present invention, the information is recorded (subjected to the draft recording) by applying the magnetic field having a polarity corresponding to the recording information by using, for example, a magnetic head. After the information is recorded as described above, the area (hereinafter referred to as "information-recorded area", in which the information has been already recorded, is irradiated with the laser beam by using, for example, an optical head so that the recorded information, which has been recorded (subjected to the draft recording) in the second magnetic film, is magnetically transferred to the first magnetic film to allow the first magnetic film to retain the information (effect the formal recording). In other words, the recording method of the present invention independently includes the magnetic field-applying process for applying the magnetic field corresponding to the recording information in order to record the information in the second magnetic film, and the laser beam-radiating process for radiating the laser beam onto the area in which the information has been already recorded in order to magnetically transfer the information recorded in the second magnetic film to the first magnetic film. The recording method of the present invention has such a feature that the information is recorded by effecting the post-irradiation with the laser beam after effecting the application of the magnetic field.

In the recording method of the present invention, the area, in which the information is recorded, can be irradiated with the laser beam, while moving the information-recording medium relative to the applying magnetic field and the laser beam to record the information by applying the magnetic field. In this procedure, it is enough that the application of the magnetic field precedes the irradiation with the laser beam when the information-recording medium is moved relative to the applying magnetic field and the laser beam. Accordingly, it is possible to concurrently perform the recording in the second magnetic film by applying the magnetic field and the transfer of the information from the second magnetic film to the first magnetic film by radiating the laser beam.

Alternatively, the information may be recorded in the second magnetic film by applying the magnetic field, and the radiation of the laser beam onto the information-recorded area, i.e., the transfer of the information from the second magnetic film to the first magnetic film may be performed after the passage of a certain period of time after the completion of the recording. That is, the information may be continuously recorded in the second magnetic film to accumulate a certain amount of information in the second magnetic film, and then the information-recorded area may be irradiated with the laser beam to magnetically transfer the information accumulated in the second magnetic film to the first magnetic film in a collective manner when the operation for recording or reproducing information is not performed on the information-recording medium. When the timing of the recording of information in the second magnetic film by applying the magnetic field is independent from the timing of the transfer of information from the second magnetic film to the first magnetic film by radiating the laser beam as described above, the information in the second magnetic film can be transferred to the first magnetic film without exerting any harmful effect on the transfer performance.

The principle of the recording method of the present invention will now be explained with reference to FIG. 3. In the following explanation, a magnetic recording medium having the following magnetic characteristics is used by way of example. As shown in FIG. 3, the magnetic recording medium comprises a first magnetic film 2 and a second magnetic film 4 in contact with each other. The first magnetic film 2 is a magnetic film which has a high coercivity and a low saturation magnetization at room temperature and which has high thermal stability. On the other hand, the second magnetic film 4 is a magnetic film which has a low coercivity and a high saturation magnetization and which is optimum for the recording and reproduction. It is assumed that the magnetic recording medium is moved in the leftward direction of the paper surface with respect to an optical head 55 and a magnetic head 53 as shown in FIG. 3.

When the magnetic head 53 is allowed to travel over the magnetic recording medium, and the magnetic field having the polarity corresponding to the recording information is applied from the magnetic head 53 to the magnetic recording medium, then a magnetic domain 11 having the polarity corresponding to the recording information is formed in the second magnetic film 4, because the second magnetic film 4 has the low coercivity. On the other hand, a magnetic domain 12 of the previous recorded information is still formed in the first magnetic film 2 irrelevant to the polarity of the magnetic field applied from the magnetic head 53, because the first magnetic film 2 has the high coercivity.

When the area (information-recorded area) of the magnetic recording medium, in which the information has been recorded, is moved to a position just under the optical head 55, the information-recorded area is heated by the converging laser beam radiated from an objective lens 56 of the optical head. In this arrangement, it is preferable that the laser beam from the optical head 55 is radiated so that the laser beam is collected (focuses) on the first magnetic film 2. The coercivity of the first magnetic film 2 in the information-recorded area is lowered by being heated by the radiation of the laser beam. As a result, the magnetic coupling force, which works between the first magnetic film 2 and the second magnetic film 4, acts strongly than the coercivity of the first magnetic film 2. A magnetic domain 13, which is formed in the second magnetic film 4, is magnetically transferred to the first magnetic film 2, and a magnetic domain 14, which has the same polarity as that of the magnetic domain 13 in the second magnetic film, is formed in the first magnetic film 2. That is, the information, which has been recorded in the second magnetic film 4, is recorded in the first magnetic film 2 by the aid of the optical head 64. The temperature of the first magnetic film is in the vicinity of the room temperature after being irradiated with the laser beam. Therefore, the saturation magnetization of the first magnetic film is lowered, and the coercivity thereof is raised. Accordingly, the first magnetic film, which has been irradiated with the laser beam, is stabilized in a state in which the first magnetic film retains the same information as the information recorded in the second magnetic film. The information recorded in the first magnetic film is also stabilized owing to the magnetic coupling force which works between the first magnetic film and the second magnetic film. The information is recorded on the information-recording medium in accordance with the principle as described above.

According to a second aspect of the present invention, there is provided an information-recording apparatus comprising:

an information-recording medium on which information is recorded;

a magnetic head which records the information;

an optical head which radiates a laser beam onto the information-recording medium; and a drive unit which moves the information-recording medium relative to the magnetic head and the optical head, wherein:

the optical head is arranged so that the optical head radiates the laser beam onto an area in which the information has been recorded by the magnetic head when the movement of the information-recording medium relative to the magnetic head and the optical head is performed.

In the information-recording apparatus of the present invention, the information-recording medium is moved relative to the magnetic head and the optical head by means of the drive unit. The optical head is arranged so that the laser beam is radiated onto the predetermined area in which the information has been recorded, after recording the information in the predetermined area of the information-recording medium by means of the magnetic head. Therefore, the information-recording apparatus as described above is extremely preferred as a recording apparatus for realizing the recording method of the present invention.

In the information-recording apparatus of the present invention, the optical head and the magnetic head can be controlled so that they are driven independently from each other. Accordingly, the information may be recorded on the information-recording medium by driving the magnetic head during the recording of the information, and then the optical head may be driven when there is no access to the information-recording medium so that the area, in which the information has been recorded, is irradiated with the laser beam. Further, the magnetic head and the optical head may be carried and fixed, for example, on a slider which is capable of floating over the information-recording medium. In this arrangement, it is desirable that the magnetic head and the optical head are arranged on the slider so that the magnetic head is positioned as to be ahead of the optical head on the slider when the slider is moved relative to the information-recording medium. The optical head and the magnetic head may be arranged so that the information-recording medium is interposed therebetween. Alternatively, the optical head and the magnetic head may be arranged so that they are positioned on the same side with respect to the information-recording medium.

In the information-recording apparatus of the present invention, it is unnecessary that the magnetic field application area formed on the information-recording medium by the magnetic head is coincident with the light irradiation area formed on the information-recording medium by the optical head, on the information-recording medium. Therefore, it is extremely easy to control the magnetic head and the optical head.

The magnetic head of the information-recording apparatus of the present invention may further comprise an reproducing element for reproducing information recorded on the information-recording medium. Those usable as such a reproducing element include an MR element (Magneto Resistive element), a GMR element (Giant Magneto Resistive element), and a TMR element (Tunneling Magneto Resistive element). When the reproducing element as described above is used, it is possible to reproduce the information recorded on the information-recording medium at a high S/N level.

According to a third aspect of the present invention, there is provided an information-recording medium for recording information thereon with a magnetic head, the information-recording medium comprising:

a substrate, and a first magnetic film and a second magnetic film which are formed on the substrate, wherein:

a laser beam is radiated after recording the information in the second magnetic film with the magnetic head, and the information, which has been recorded in the second magnetic film, is magnetically transferred to the first magnetic film.

In the information-recording medium of the present invention, the information is recorded in the second magnetic film, and then the information, which has been recorded in the second magnetic film, is magnetically transferred to the first magnetic film by being irradiated with the laser beam. Accordingly, the recorded information is also retained in the first magnetic film. The information-recording medium as described above is extremely preferred as an information-recording medium on which information is recorded by using the recording method according to the first aspect of the present invention.

In the present invention, the first magnetic film may be composed of an amorphous ferrimagnetic material, which may be a perpendicularly magnetizable film having an easy axis of magnetization directed in a direction perpendicular to a substrate surface. In this arrangement, the ferrimagnetic material is preferably composed of an alloy comprising an iron family element and a rare earth element. The iron family element is preferably at least one element selected from Fe, Co, and Ni, and the rare earth element is preferably at least one element selected from Tb, Gd, Dy, and Ho.

The second magnetic film may be an in-plane magnetizable film having an easy axis of magnetization directed in a direction parallel to a substrate surface. Also in this arrangement, the ferrimagnetic material for constituting the first magnetic film is preferably composed of an alloy comprising an iron family element and a rare earth element. The iron family element is preferably at least one element selected from Fe, Co, and Ni, and the rare earth element is preferably at least one element selected from Er, Tm, Nd, Pr, Tb, Dy, Ho, Gd, and Sm.

The second magnetic film may be composed of an alloy principally containing Co—Cr. Further, the second magnetic film may be also a crystalline alloy thin film containing, in the alloy principally containing Co—Cr, at least one element selected from Pt, Pd, Ta, Nb, Si, V, B, and Ti. The second magnetic film may be constituted either as a perpendicularly magnetizable film or as an in-plane magnetizable film. When the second magnetic film is constituted as the in-plane magnetizable film, then the concentration of Cr may be about 10 at. % to 25 at. %, and the concentration of the element to be added to the alloy principally containing Co—Cr may be about 10 at. % to 25 at. %. When the second magnetic film is constituted as the perpendicularly magnetizable film, then the concentration of Cr may be about 30 at. % to 40 at. %, and the concentration of the element to be added to the alloy principally containing Co—Cr may be about 10 at. % to 25 at. %. Especially preferred material systems include Co—Cr—Pt, Co—Cr—Pt—B, Co—Cr—Pt—Ta, and Co—Cr—Pt—Ta—B.

The information-recording medium of the present invention may further comprise an intermediate film which is provided between the first magnetic film and the second magnetic film. When the intermediate film is provided, then magnetic coupling force between the first magnetic film and the second magnetic film is controlled, and the crystalline orientation of the second magnetic film is controlled. When the magnetic coupling force between the first magnetic film and the second magnetic film is appropriately controlled by adjusting the material and the film thickness of the intermediate film, it is possible to transfer the information in the second magnetic film to the first magnetic film in a well-suited manner. Further, the intermediate film makes it possible to block, between the first magnetic film and the second magnetic film, the heat generated in the first magnetic film or the second magnetic film by being irradiated with the laser beam during the recording of information. Those preferably usable as the material for constituting the intermediate film as described above include a material comprising crystal grains of oxide of at least one element selected from Mg, Co, and Ni singly, and a material formed with an amorphous phase of oxide of at least one element selected from Si, Zn, Ti, Ta, and Al so that the crystal grains as described above are surrounded thereby.

Alternatively, the intermediate film can be also constituted by using a soft magnetic material. When the intermediate film is constituted with the soft magnetic material, the magnetic coupling force between the first magnetic film and the second magnetic film can be precisely controlled, which is preferred for the super high density recording. Those preferably usable as the material include material systems of, for example, MgO, $CoO$—$SiO_2$, $CoO$—$SiO_2$—$TiO_2$, $NiO$—$SiO_2$, $Co_3O_4$—$SiO_2$, $Co$—$O$—$Ta_2O_5$, $NiO$—$Al_2O_3$, and $CoO$—$ZnO$. MgO, CoO, $Co_3O_4$, or NiO may be used as a main component to which, for example, $SiO_2$, $Ta_2O_5$, $Al_2O_3$, and/or ZnO may be added. Accordingly, it is possible to control, for example, the crystal shape and the crystal grain size. Those preferably usable as the soft magnetic material include, for example, Supermalloy, Sendust, Fe—Co—Si—B (specifically $Fe_{4.7}Co_{70.3}Si_{15}B_{10}$), and Co—Nb—Zr.

In the information-recording medium of the present invention, it is preferable that a coercivity of the first magnetic film at the room temperature is larger than a coercivity of the second magnetic film. Accordingly, the recorded information, which has been transferred from the second magnetic film by being irradiated with the laser beam, can be stably retained in an environment at the room temperature. It is preferable that a coercivity of the first magnetic film is smaller than a coercivity of the second magnetic film at a temperature (about 80° C. to 130° C.) obtained by being heated by the irradiation with the laser beam. Accordingly, when the information-recording medium is heated by the irradiation with the laser beam, it is possible to magnetically transfer the information recorded in the second magnetic film reliably in a well-suited manner. In order to stabilize the magnetic domain (recorded information) formed in the first magnetic film in an environment at the room temperature, it is preferable that the saturation magnetization of the first magnetic film is smaller than the saturation magnetization of the second magnetic film at the room temperature.

The information, which is recorded on the information-recording medium of the present invention, can be reproduced by directly detecting, for example, the leak magnetic field from the magnetic domain formed in the second magnetic film, for example, by using a magneto resistive element. Alternatively, the information may be reproduced by detecting the signal (magneto-optical signal) on the basis of the magneto-optical effect (for example, the Kerr effect) from the magnetic domain formed in the second magnetic film by using the optical head.

In the present invention, the laser beam, with which the information-recording medium is irradiated, may be allowed to come into the information-recording medium from the side of the substrate. Alternatively, the laser beam may be allowed to come into the information-recording medium from the side opposite to the substrate.

BRIEF DESCRIPTION OF THE DRAWINGS

FIG. 2 shows a schematic arrangement of a magnetic recording apparatus according to the present invention, wherein FIG. 2(A) shows a plan view illustrating the magnetic recording apparatus, and FIG. 2(B) shows a partial magnified sectional view illustrating those disposed in the vicinity of an optical head and a magnetic head.

BEST MODE FOR CARRYING OUT THE INVENTION

The information-recording medium, the information-recording apparatus, and the recording method according to the present invention will be explained in detail below on the basis of embodiments. However, the present invention is not limited thereto.

First Embodiment

Figure 1:
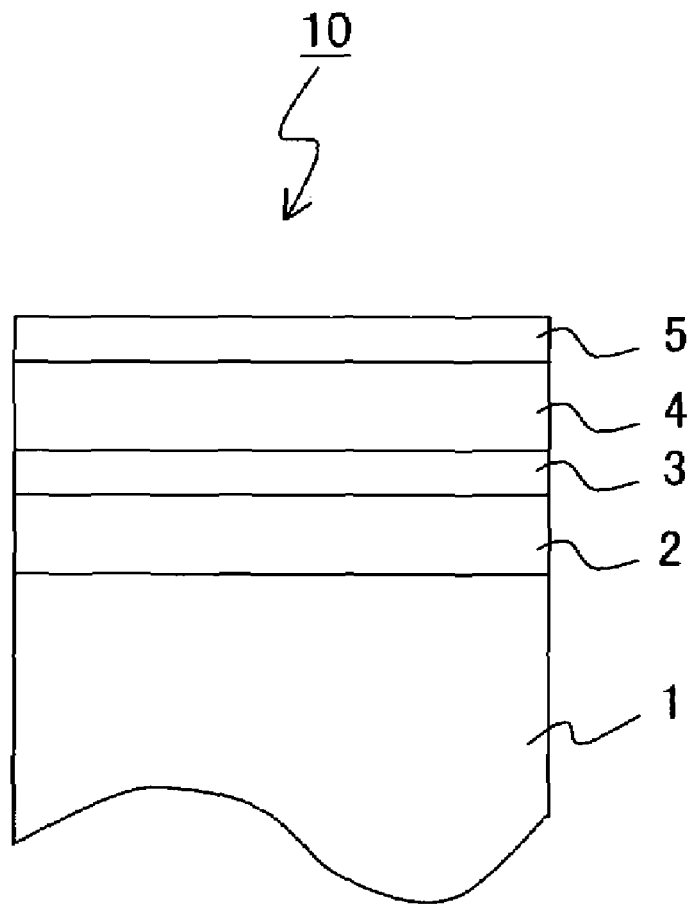
FIG. 1 schematically shows a cross-sectional structure of a magnetic recording medium manufactured in an embodiment.
Figure 3:
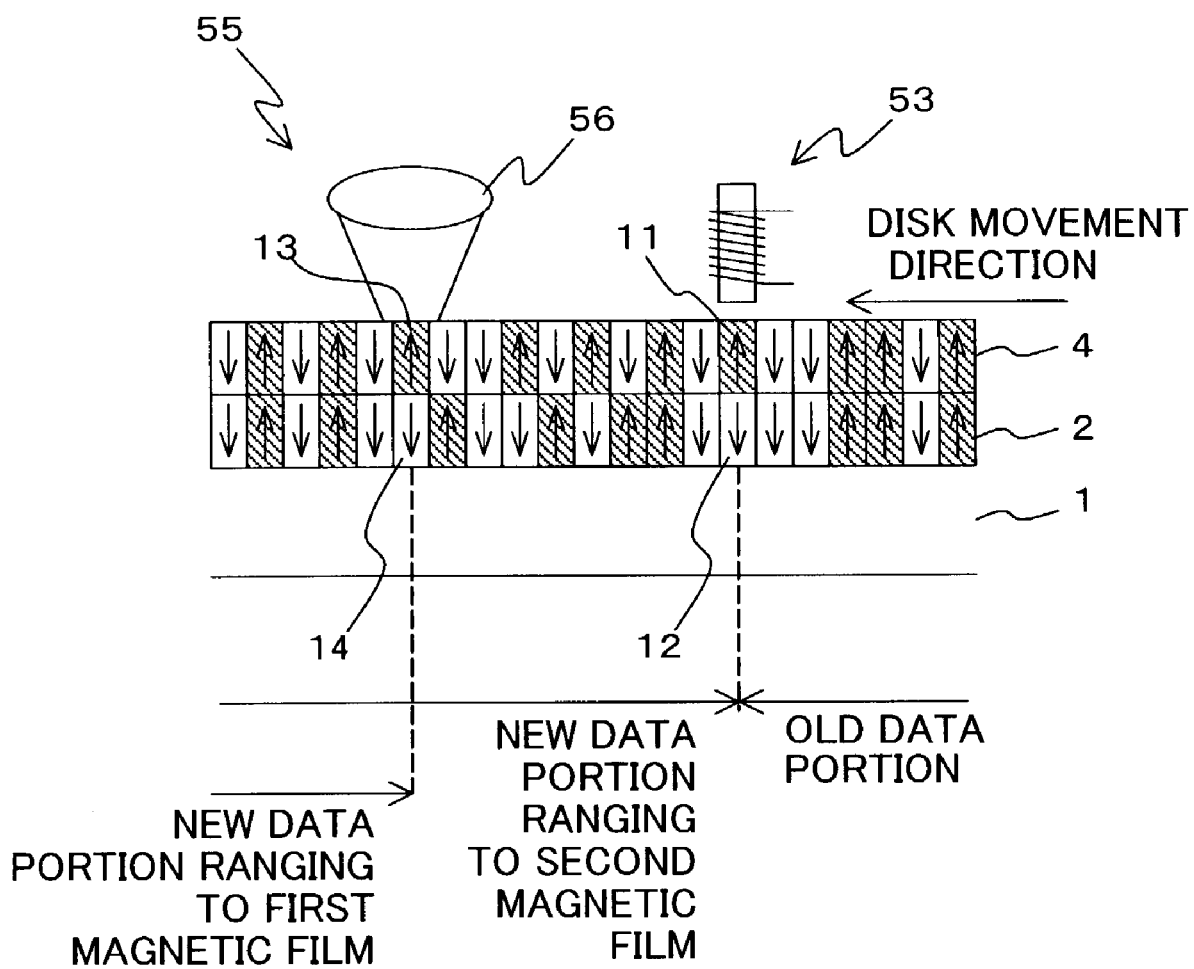
FIG. 3 conceptually explains the principle of the recording method of the present invention.

In this embodiment, a magnetic recording medium of the perpendicular magnetic recording type having a stacked structure as shown in FIG. 1 was manufactured as the information-recording medium according to the present invention. The magnetic recording medium 10 comprises, on a disk substrate 1, a ferrimagnetic film (first magnetic film) 2, a non-magnetic intermediate film 3, an information-recording film (second magnetic film) 4, and a protective film 5. A Tb—Fe—Co film was used for the ferrimagnetic film 2, and a Co—Cr—Pt film of a hard magnetic material was used for the information-recording medium 4. An MgO film was used for the non-magnetic intermediate film 3 formed between the ferrimagnetic film 2 and the information-recording medium 4. The MgO film makes it possible to control the magnetic interaction exerted between the ferrimagnetic film 2 and the information-recording film 4. An explanation will be made below about a method for producing the magnetic recording medium 10 having the stacked structure as described above.

Formation of First Magnetic Film

At first, a glass substrate of 2.5 inches (about 6.35 cm) was prepared as the disk substrate 1 having rigidity. A Tb—Fe—Co film was formed as the ferrimagnetic film 2 on the substrate 1 by means of the RF magnetron sputtering method. A sintered material of $Tb_{22.5}Fe_{65.5}Co_{12}$ was used for the sputtering target, and Ar was used for the electric discharge gas. The gas pressure during the electric discharge was 5 mTorr (about 665 mPa), and the introduced RF power was 1 kw/150 mmφ. The film thickness of the ferrimagnetic film 2 was 30 nm. An underlying base film may be formed on the substrate in order to protect the ferrimagnetic film and improve the adhesive force with respect to the substrate before forming the ferrimagnetic film 2.

The magnetic characteristics of the ferrimagnetic film 2 obtained by the sputtering as described above were investigated. As a result, the coercivity was 8 kOe (about 636.64 kA/m), and the saturation magnetization was 120 emu/ml. The compensation temperature was 60° C., and the Curie temperature was 170° C. The sub-lattice magnetization of Fe is dominant in the composition of the Tb—Fe—Co film for constituting the ferrimagnetic film 2. As for the values of the coercivity and the saturation magnetization, desired values are obtained by adjusting the composition ratio between the rare earth element and the iron family element for constituting the ferrimagnetic film 2.

Formation of Non-Magnetic Intermediate Film

Subsequently, an MgO film was formed as the non-magnetic intermediate film 3 on the ferrimagnetic film 2 by means of the electron cyclotron resonance (ECR) sputtering method to utilize the resonance absorption based on the microwave. The non-magnetic intermediate film 3 is capable of not only controlling the magnetic coupling force between the ferrimagnetic film 2 and the information-recording film 4 but also controlling the crystalline orientation and the crystal grain diameter of the information-recording film 4 formed on the non-magnetic intermediate film. MgO was used for the sputtering target, and high purity Ar gas was used for the electric discharge gas. The pressure during the sputtering was 0.3 mTorr (about 39.9 mPa), and the introduced microwave electric power was 0.7 kW. An RF bias of 500 W was applied in order to draw the plasma excited by the microwave. The film was formed at room temperature during the sputtering without heating the substrate.

Formation of Information-Recording Film

Subsequently, a $Co_{69}Cr_{19}Pt_{12}$ film was formed to have a film thickness of 10 nm as the information-recording film 4 on the non-magnetic intermediate film 3 by means of the DC sputtering method. The substrate was heated to 150° C. during the film formation of the information-recording film 4. A Co—Cr—Pt alloy was used for the sputtering target, and pure Ar was used for the electric discharge gas. The pressure during the sputtering was 3 mTorr (about 39.9 mPa), and the introduced DC electric power was 1 kW/150 mmφ.

In this procedure, the DC magnetron sputtering method was used for the film formation of the information-recording film 4. However, the ECR sputtering method, which utilizes the resonance absorption based on the microwave, may be used. When the information-recording film is formed by using the ECR sputtering method, then the coercivity of the obtained film is increased by about 0.5 kOe (about 39.79 kA/m) as compared with the coercivity of the film obtained by the film formation based on the DC magnetron sputtering method, and any deterioration of the coercivity is not observed even in the case of a film thickness of not more than 10 nm. Further, the magnetic anisotropy energy is greatly increased not less than three times.

Subsequently, the magnetic characteristics of the information-recording film 4 were investigated in a single film state. The obtained magnetic characteristics were as follows. That is, the coercivity was 3.5 kOe (about 278.53 kA/m), and Isv was $2.5 \times 10^{-16}$ emu. S as the index of the rectangularity of the hysteresis in the M-H loop was 0.90, and $S^+$ was 0.95. The information-recording film 4 had the good magnetic characteristics. The reason, why the index to indicate the rectangularity is large (approximate to the rectangle), is that the interaction is reduced between the magnetic crystal grains of the magnetic material for constituting the information-recording film. The value of the saturation magnetization of the information-recording film was 280 emu/ml. Both of the ferrimagnetic film (first magnetic film) and the information-recording film (second magnetic film) were perpendicularly magnetizable films in each of which the easy axis of magnetization was directed in the direction perpendicular to the substrate surface.

Formation of Protective Film

Finally, a C (carbon) film was formed as the protective film 5 to have a film thickness of 5 nm. The protective layer was formed as the film by using the ECR sputtering method to utilize the resonance absorption based on the microwave. The pressure during the sputtering was 0.3 mTorr (about 39.9 mPa), and the introduced microwave electric power was 0.7 kW. A DC bias voltage of 500 V was applied in order to draw the plasma excited by the microwave.

In this procedure, Ar was used for the sputtering gas. However, the film may be formed by using a gas containing nitrogen. When the gas containing nitrogen is used, the grains are made fine and minute. Therefore, the obtained C film is densified, and it is possible to further improve the protection performance. The quality of the carbon film greatly depends on the sputtering condition. Therefore, the condition described above is not absolute. It is desirable to appropriately adjust the condition, if necessary.

The reason, why the ECR sputtering method was used for forming the protective film, is that the obtained film is dense and free from pin hole and the coating performance is satisfactory, even when the film thickness is extremely thin, i.e., 2 to 3 nm. This provides a remarkable difference as compared with the RF sputtering method and the DC sputtering method. Additionally, it is also possible to suppress the damage exerted on the magnetic film during the film formation. In particular, when the high density recording exceeding 50 Gbits/inch$^2$ (about 7.75 Gbits/cm$^2$) is performed, it is considered that the thickness of the magnetic film is not more than 10 nm. Therefore, the influence of the damage, which is received by the magnetic film during the film formation, is increasingly conspicuous. In such a situation, the ECR sputtering method is an extremely effective film formation method, which is preferred to produce the magnetic recording medium for the super high density magnetic recording.

Magnetic Recording Apparatus

Thus, the magnetic recording medium having the stacked structure as shown in FIG. 1 was manufactured. Subsequently, a lubricant was applied onto the surface of the obtained magnetic recording medium to complete the magnetic disk. A plurality of magnetic disks were manufactured in accordance with the same process, and they were coaxially incorporated into a magnetic recording apparatus. A schematic arrangement of the magnetic recording apparatus is shown in FIG. 2.

FIG. 2(A) shows a top view illustrating the magnetic recording apparatus 100, and FIG. 2(B) shows a partial magnified sectional view illustrating those disposed in the vicinity of a magnetic head 53 of the magnetic recording apparatus 100 shown in FIG. 2(A). As shown in FIG. 2(B), an optical head 55 and the magnetic head 53 are arranged opposingly to one another with the magnetic disk 51 intervening therebetween in the magnetic recording apparatus 100. The optical head 55 and the magnetic head 53 are positioned so that the magnetic head 53 effects the scanning prior to the optical head 55 when the surface of the magnetic disk 51 is subjected to the scanning. The optical head 55 comprises a semiconductor laser (not shown) having a wavelength of 630 nm and a lens (not shown) having a numerical aperture (NA) of 0.60. In FIGS. 2(A) and 2(B), the magnetic head 53 is an integrated type magnetic head in which a recording magnetic head and a reproducing magnetic head are integrated into one unit. A thin film magnetic head based on the use of a soft magnetic film having a high saturation magnetic flux density of 2.1 T was used for the recording magnetic head. The gap length of the recording magnetic head was 0.12 $\mu$m. A dual spin-valve type GMR magnetic head having the giant magnetoresistance effect was used for the reproducing magnetic head. The integrated type magnetic head 53 is controlled by a magnetic head-driving system 54. The position of the optical head 55 is controlled on the basis of the control information used in the magnetic head-driving system 54. The plurality of magnetic disks 51 are coaxially rotated by a spindle 52. The magnetic head 53 is controlled so that the distance between the bottom surface of the magnetic head 53 and the surface of the magnetic disk 51 is 12 nm during the recording or the reproduction of information. In the magnetic recording apparatus constructed as described above, the magnetic disks are arranged so that the laser beam from the optical head comes thereinto from the side of the substrates.

The magnetic recording apparatus as described above was operated to record a signal corresponding to 50 Gbits/inch$^2$ (about 7.75 Gbits/cm$^2$) in the information-recording film of the magnetic disk by using the magnetic head, and then the recorded information was reproduced to evaluate S/N. As a result, a reproduction output of 33 dB was obtained.

Subsequently, the area, in which the information had been already recorded by the magnetic head, was irradiated with the laser beam having a laser power of 6 mW emitted from the optical head 55, while focusing the laser beam on the ferrimagnetic film of the magnetic disk. According to a result of simulation calculation, it was revealed that the temperature of the first magnetic film (ferrimagnetic film) heated by being irradiated with the laser beam was about 130° C., the coercivity of the first magnetic film at such a temperature had a magnitude of about 60% of that of the coercivity of the second magnetic film. As described above, the coercivity of the first magnetic film is lowered in the area irradiated with the laser beam, and the magnetic coupling force between the first magnetic film and the second magnetic film exceeds the coercivity. Therefore, in such an area, the magnetization information of the second magnetic film is magnetically transferred to the first magnetic film. When the light irradiation is stopped, or when the area, to which the information has been transferred, is located outside the light irradiation area, then the temperature is in the vicinity of room temperature, and the coercivity of the first magnetic film is larger than the coercivity of the second magnetic film. The first magnetic film is stabilized in a state in which the recorded information is retained. Thus, the information is recorded in the first and second magnetic films.

Environmental Test

Subsequently, an environmental test was performed in order to investigate the thermal stability of the magnetic disk. In the environmental test, the magnetic disk, on which a signal corresponding to 50 Gbits/inch$^2$ (about 7.75 Gbits/cm$^2$) had been recorded, was left to stand in an environment at 80° C. for not less than 1000 hours, and then the recorded signal was reproduced. As a result, the decrease in output was not more than 3% as compared with the reproduced signal output obtained before the environmental test. For the purpose of comparison, a magnetic disk having a structure of substrate/MgO/Co—Cr—Pt/C, which was not provided with the ferrimagnetic film, was manufactured as a conventional magnetic disk. The magnetic disk was used to perform the environmental test in the same manner as described above. As a result, the decrease in output of 30% was observed with respect to the reproduced signal output obtained before the environmental test. As described above, the magnetic disk of the present invention successfully improved the thermal stability to the great extent as compared with the conventional magnetic disk which was not provided with the ferrimagnetic layer. The error rate or defect rate of the disk was measured. As a result, a value of not more than $1\times10^{-5}$ was obtained when the signal processing was not performed.

Second Embodiment

Figure 4:
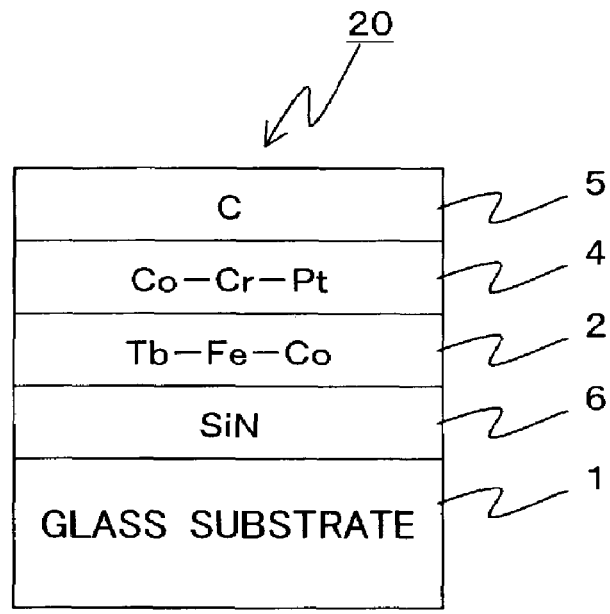
FIG. 4 shows a schematic sectional view illustrating a magnetic recording medium manufactured in a second embodiment.

In this embodiment, a magnetic recording medium was produced by using the same materials and the method as those used in the first embodiment except that a dielectric layer was provided between the substrate and the ferrimagnetic film, and the intermediate film was not provided between the ferrimagnetic film (first magnetic film) and the information-recording film (second magnetic film). FIG. 4 shows a schematic sectional view illustrating the magnetic recording medium 20. The magnetic recording medium 20 of this embodiment is a magnetic recording medium of the type in which the ferrimagnetic film 2 and the information-recording film 4 are subjected to the exchange coupling.

The RF magnetron sputtering method was used to form a film of the dielectric layer 6. The film thickness of the dielectric layer 6 was 20 nm. Si was used for the sputtering target, and an Ar/N$_2$ mixed gas (mixing ratio: 90/10) was used for the sputtering gas. The pressure during the sputtering was 3 mTorr (about 399 mPa), and the introduced RF electric power was 1 kW/150 mm$\phi$. The film may be formed by using Si$_3$N$_4$ as the target. The characteristics of the obtained film are not affected by the film formation method.

The materials and the film formation methods for the ferrimagnetic film 2, the information-recording film 4, and the protective film 5 other than those for the dielectric layer 6 are the same as those used in the first embodiment, any explanation of which is omitted.

Magnetic Recording Apparatus and Environmental Test

Subsequently, a lubricant was applied onto the surface of the magnetic recording medium in the same manner as in the first embodiment, and a plurality of magnetic disks were manufactured. The plurality of obtained magnetic disks were coaxially incorporated into a magnetic recording apparatus. The magnetic recording apparatus was constructed in the same manner as in the first embodiment, which had the arrangement as shown in FIGS. 2(A) and 2(B).

An environmental test was performed in order to investigate the thermal stability of the magnetic disk. In the environmental test, the magnetic recording apparatus was operated to record a signal corresponding to 50 Gbits/inch$^2$ (about 7.75 Gbits/cm$^2$) on the magnetic disk. The magnetic disk was left to stand in an environment at 80° C. for not less than 1000 hours, and then the recorded signal was reproduced. As a result, the decrease in output was not more than 3% as compared with the reproduced signal output obtained before the environmental test. As described above, the magnetic disk of this embodiment successfully improved the thermal stability to the great extent as well. The error rate or defect rate of the disk was measured. As a result, a value of not more than 1×10$^{-5}$ was obtained when the signal processing was not performed.

Third Embodiment

Figure 5:
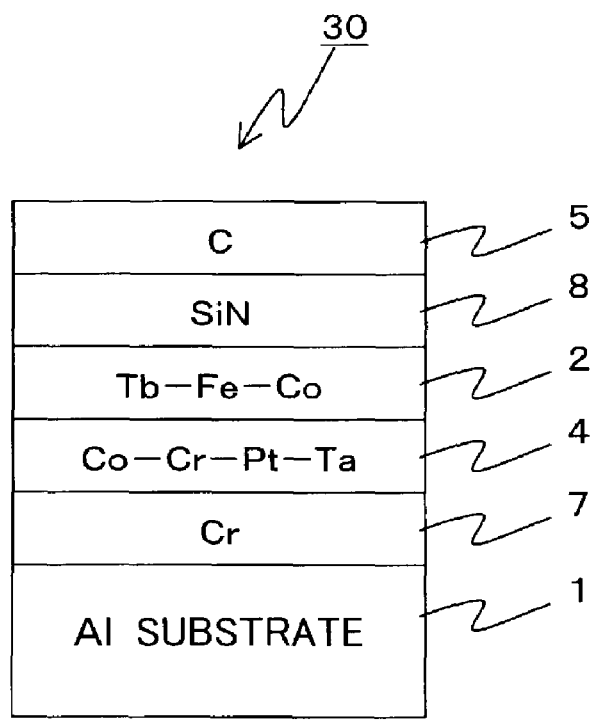
FIG. 5 shows a schematic sectional view illustrating a magnetic recording medium manufactured in a third embodiment.

In this embodiment, a magnetic recording medium having a stacked structure as shown in FIG. 5 was manufactured. The magnetic recording medium 30 has a structure comprising an underlying base film 7, an information-recording film (second magnetic film) 4, a ferrimagnetic film (first magnetic film) 2, a dielectric film 8, and a protective layer 5 which are successively stacked in this order on an Al substrate 1. The magnetic recording medium 30 of this embodiment is also a magnetic recording medium of the type in which the ferrimagnetic film 2 and the information-recording film 4 are subjected to the exchange coupling in the same manner as in the magnetic recording medium of the second embodiment. A Co—Cr—Pt—Ta film of a hard magnetic material was used for the information-recording film 4, and a Tb—Fe—Co film was used for the ferrimagnetic film 2. Cr was used for the underlying base film 7. An explanation will be made below about a method for producing the magnetic recording medium 30 having the stacked structure as described above.

Formation of Underlying Base Film

At first, an Al substrate of 2.5 inches (about 6.35 cm) was prepared as the disk substrate 1 having rigidity. A Cr film was formed as the underlying base film 7 on the substrate 1 by means of the RF magnetron sputtering method. Cr was used for the sputtering target, and Ar was used for the electric discharge gas. The gas pressure during the electric discharge was 5 mTorr (about 665 mPa), and the introduced power was 1 kW/150 mm$\phi$. The film thickness of the underlying base film was 20 nm.

Formation of Information-Recording Film

Subsequently, a $Co_{67}Cr_{18}Pt_{12}Ta_3$ film was formed to have a film thickness of 20 nm as the information-recording film 4 on the underlying base film 7 by means of the DC sputtering method. The substrate was heated to 150° C. during the film formation of the information-recording film 4. A Co—Cr—Pt—Ta alloy was used for the sputtering target, and pure Ar was used for the electric discharge gas. The pressure during the sputtering was 3 mTorr (about 39.9 mPa), and the introduced DC electric power was 1 kW/150 mm$\phi$.

The magnetic characteristics of the information-recording film 4 were investigated in a single film state. The obtained magnetic characteristics were as follows. That is, the coercivity was 3.5 kOe (about 278.53 kA/m), and Isv was 2.5×10$^{-16}$ emu. S as the index of the rectangularity of the hysteresis in the M-H loop was 0.90, and S$^+$ was 0.95. The information-recording film 4 had the good magnetic characteristics. The reason, why the index to indicate the rectangularity is large (approximate to the rectangle), is that the interaction is reduced between the magnetic crystal grains of the magnetic material for constituting the information-recording film. The value of the saturation magnetization of the information-recording film was 280 emu/ml.

Formation of Ferrimagnetic Film

Subsequently, a Tb—Fe—Co film was formed as the ferrimagnetic film 2 on the information-recording film 4 by means of the RF magnetron sputtering method. A sintered material of $Tb_{22.5}Fe_{65.5}Co_{12}$ was used for the sputtering target, and Ar was used for the electric discharge gas. The gas pressure during the electric discharge was 5 mTorr (about 665 mPa), and the introduced RF power was 1 kW/150 mm$\phi$. The film thickness of the ferrimagnetic film 2 was 30 nm.

The magnetic characteristics of the ferrimagnetic film 2 obtained by the sputtering as described above were investigated. As a result, the coercivity was 8 kOe (about 636.64 kA/m), and the saturation magnetization was 120emu/ml. The compensation temperature was 60° C., and the Curie temperature was 170° C. The sub-lattice magnetization of Fe is dominant in the composition of the Tb—Fe—Co film for constituting the ferrimagnetic film. As for the values of the coercivity and the saturation magnetization, desired values are obtained by adjusting the composition ratio between the rare earth element and the iron family element for constituting the ferrimagnetic film 2. Both of the ferrimagnetic film (first magnetic film) 2 and the information-recording film (second magnetic film) 4 were perpendicularly magnetizable films in each of which the easy axis of magnetization was directed in the direction perpendicular to the substrate surface.

Formation of Dielectric Film

Subsequently, an SiNx film was formed as the dielectric layer 8 on the ferrimagnetic film 21 by means of the RF magnetron sputtering method. SiN was used for the sputtering target, and an Ar—N$_2$ mixed gas (mixing ratio: 90/10) was used for the electric discharge gas. The gas pressure during the electric discharge was 10 mTorr (about 1.33 Pa), and the-introduced power was 1 kW/150 mm$\phi$. The film thickness of the dielectric film 8 was 3 nm.

Formation of Protective Film

Finally, a C (carbon) film was formed to have a film thickness of 5 nm as the protective film 5. The protective film 5 was formed by using the ECR sputtering method to utilize the resonance absorption based on the microwave. The pressure during the sputtering was 0.3 mTorr (about 39.9 mPa), and the introduced microwave electric power was 0.7 kW. A DC bias voltage of 500 V was applied in order to draw the plasma excited by the microwave.

Magnetic Recording Apparatus

Thus, the magnetic recording medium having the stacked structure as shown in FIG. 5 was manufactured. Subsequently, a lubricant was applied onto the surface of the obtained magnetic recording medium in the same manner as in the first embodiment. A plurality of magnetic disks were manufactured, and the plurality of obtained magnetic disks were incorporated into a magnetic recording apparatus having a schematic arrangement as shown in FIGS. 6 and 7.

Figure 6:
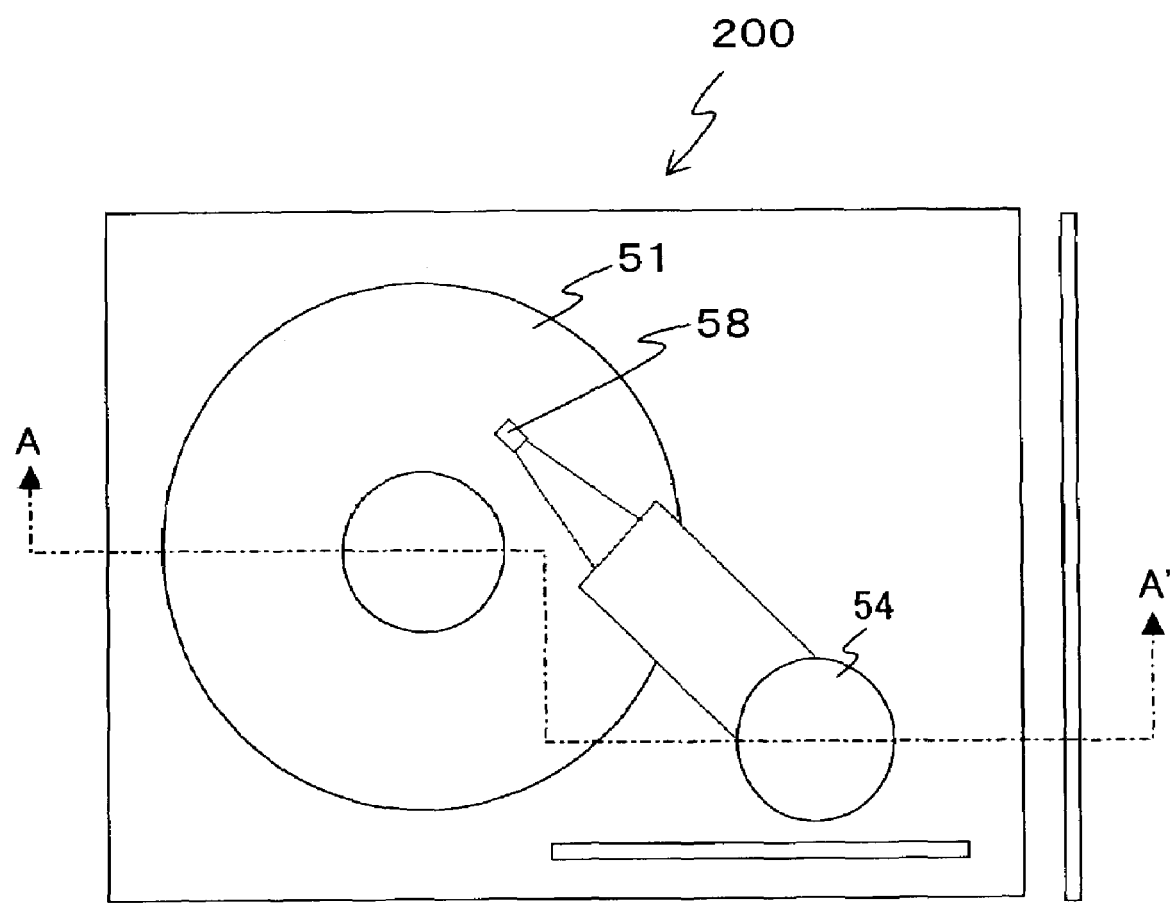
FIG. 6 shows a schematic arrangement of a magnetic recording apparatus in which a magnetic head and an optical head are arranged on an identical side with respect to a magnetic disk.
Figure 7:
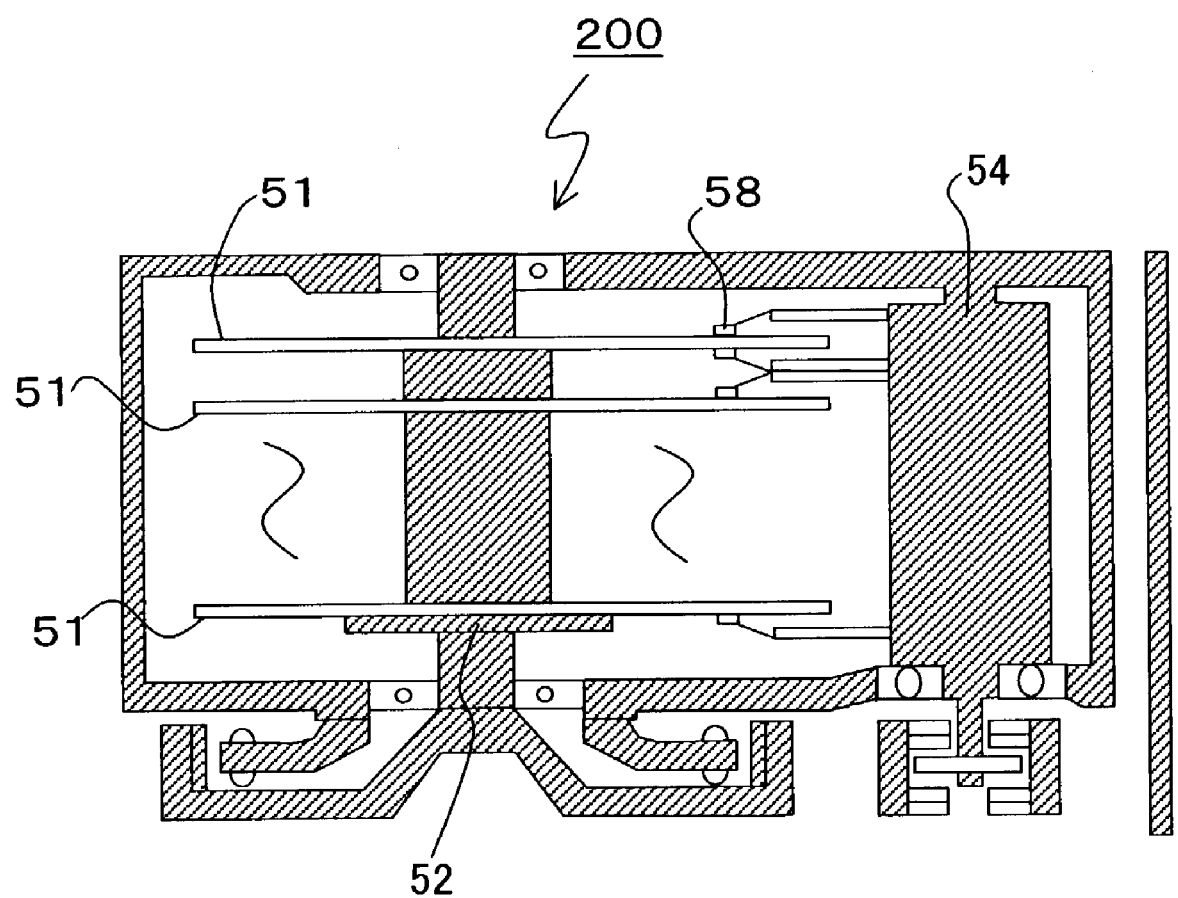
FIG. 7 shows a schematic sectional view taken along a direction A-A' of the magnetic recording apparatus shown in FIG. 6.
Figure 8:
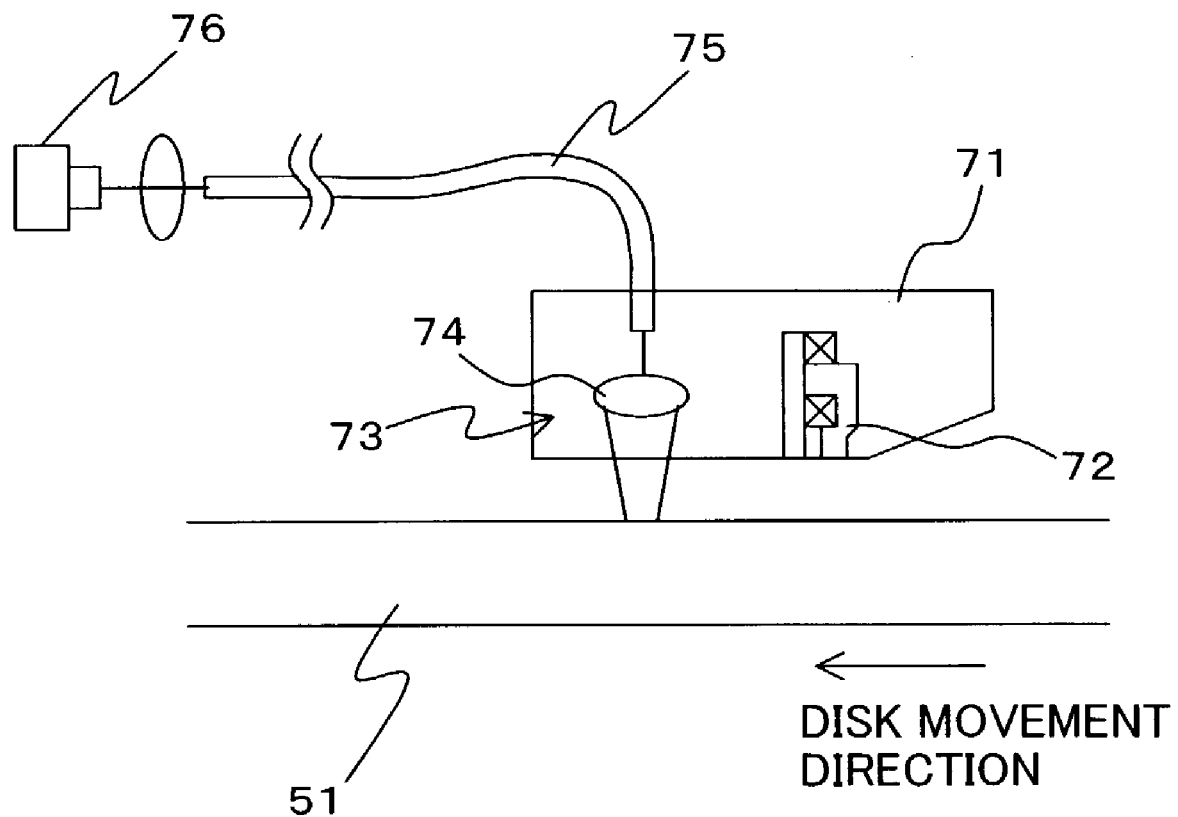
FIG. 8 shows a schematic sectional view illustrating a magneto-optical head carried on the magnetic recording apparatus shown in FIG. 6.

FIG. 6 shows a top view illustrating the magnetic recording apparatus 200, and FIG. 7 shows a sectional view taken in a direction of broken line A-A' illustrating the magnetic recording apparatus 200 shown in FIG. 6. As shown in FIGS. 6 and 7, a magneto-optical head 58 is capable of applying the light beam and the magnetic field to the magnetic disk 51 from the side of the protective film. FIG. 8 shows a schematic arrangement of the magneto-optical head. The magneto-optical head 58 is provided with a floating slider 71. A magnetic head 72 and an optical head 73 are carried on the floating slider 71. The magnetic head 72 and the optical head 73 are positioned in the floating slider so that the magnetic head 72 effects the scanning prior to the optical head 73 when the surface of the magnetic disk 51 is subjected to the scanning by the magneto-optical head 58. The magnetic head 72 is a magnetic head in which a recording magnetic head and a reproducing magnetic head are integrated into one unit. A thin film magnetic head based on the use of a soft magnetic film having a high saturation magnetic flux density of 2.1 T was used for the recording magnetic head. The gap length of the recording magnetic head was 0.12 μm. A dual spin-valve type GMR magnetic head having the giant magnetoresistance effect was used for the reproducing magnetic head.

The optical head 73 principally comprises an objective lens 74, and an optical fiber 75 for introducing the laser beam from a laser light source 76 into the objective lens 74. A semiconductor laser having a wavelength of 630 nm was used for the laser light source 76. A lens of numerical aperture NA=0.60 was used for the objective lens 74.

With reference to FIGS. 6 and 7, the magneto-optical head 58 is controlled by a driving system 34. The magneto-optical head 58 is positioned over the magnetic disk 51 by detecting the magnetic servo signal recorded on the magnetic disk 51 by using the magnetic head 72 carried on the magneto-optical head 58. The magnetic disk 51 is driven and rotated by a spindle 33. The control is made so that the distance between the bottom surface of the floating slider and the information-recording layer is maintained to be 12 nm.

Environmental Test

An environmental test was performed in order to investigate the thermal stability of the magnetic disk. In the environmental test, the magnetic recording apparatus was operated to record a signal corresponding to 50 Gbits/inch$^2$ (about 7.75 Gbits/cm$^2$) on the magnetic disk. The magnetic disk was left to stand in an environment at 80° C. for not less than 1000 hours, and then the recorded signal was reproduced. As a result, the decrease in output was not more than 3% as compared with the reproduced signal output obtained before the environmental test. As described above, the magnetic disk of this embodiment successfully improved the thermal stability to the great extent as well. The error rate or defect rate of the disk was measured. As a result, a value of not more than $1 \times 10^{-5}$ was obtained when the signal processing was not performed.

Fourth Embodiment

Figure 9:
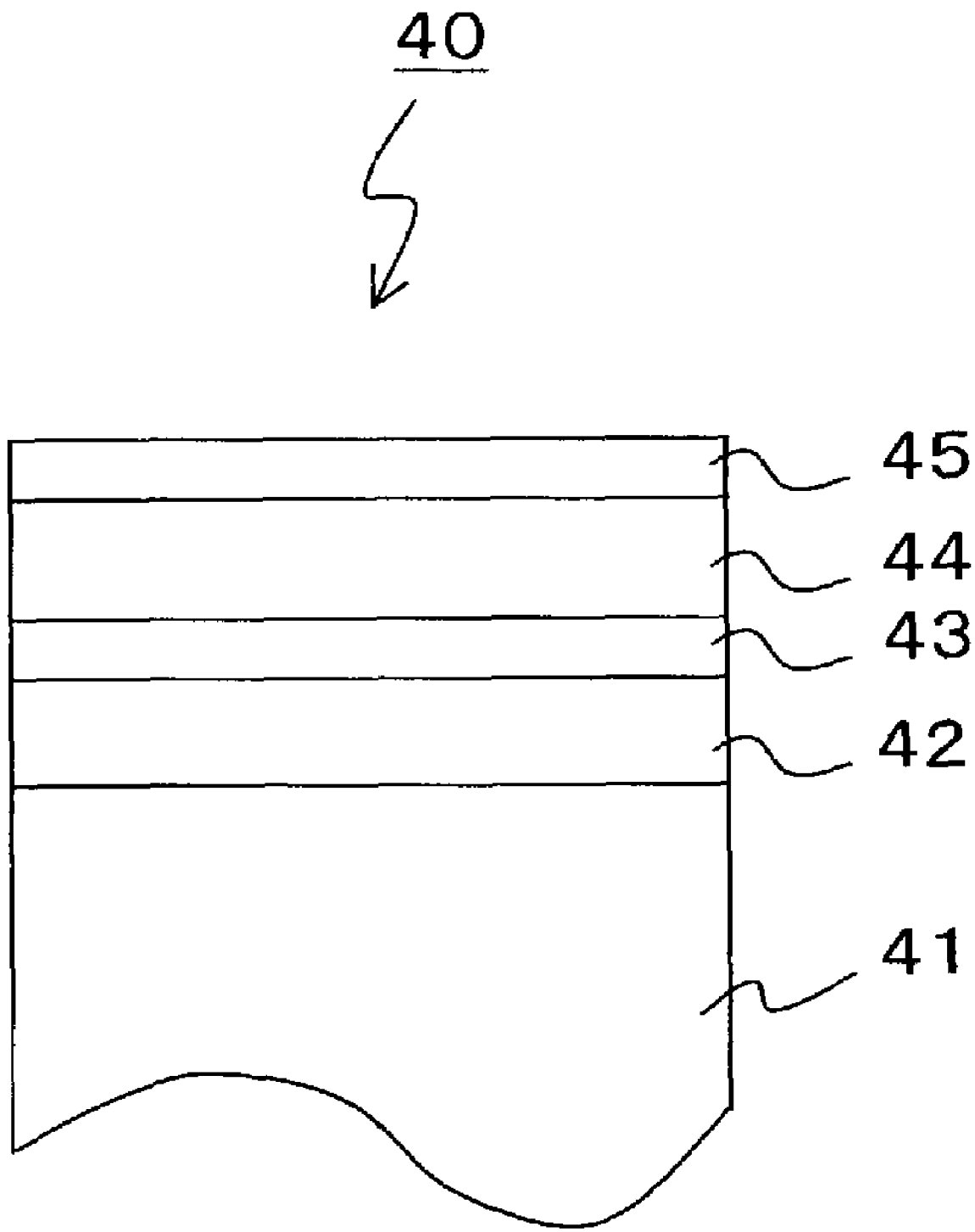
FIG. 9 shows a schematic sectional view illustrating a magnetic recording medium manufactured in a fourth embodiment.

In this embodiment, a magnetic recording medium of the in-plane magnetic recording type having a stacked structure as shown in FIG. 9 was manufactured as the information-recording medium according to the present invention. The magnetic recording medium 40 comprises, on a disk substrate 41, a ferrimagnetic film (first magnetic film) 42, a nonmagnetic intermediate film 43, an information-recording film (second magnetic film) 44, and a protective film 45. An Er—Fe—Co film was used for the ferrimagnetic film 42, and a Co—Cr—Pt—Ta film of a hard magnetic material was used for the information-recording film 44. An MgO film was used for the non-magnetic intermediate film 43 formed between the ferrimagnetic film 42 and the information-recording film 44. The MgO film as described above makes it possible to control the magnetic interaction exerted between the ferrimagnetic film 42 and the information-recording film 44. An explanation will be made below about a method for producing the magnetic recording medium 40 having the stacked structure as described above.

Formation of First Magnetic Film

At first, an Er—Fe—Co film was formed as the ferrimagnetic film 42 on a glass substrate 41 of 2.5 inches (about 6.35 cm) by means of the RF magnetron sputtering method. A sintered material of $Er_{22}Fe_{68}Co_{10}$ was used for the sputtering target, and Ar was used for the electric discharge gas. The gas pressure during the electric discharge was 3 mTorr (about 399 mPa), and the introduced RF power was 1 kW/150 mmφ. The film thickness of the ferrimagnetic film 42 was 50 nm. An underlying base film may be formed on the substrate in order to protect the ferrimagnetic film and improve the adhesive force with respect to the substrate before forming the ferrimagnetic film 42.

The magnetic characteristics of the ferrimagnetic film 42 obtained by the sputtering as described above were investigated. As a result, the coercivity was 3.5 kOe (about 278.53 kA/m), and the saturation magnetization was 400 emu/ml. As for the values of the coercivity and the saturation magnetization, desired values are obtained by adjusting the composition ratio between the rare earth element and the iron family element for constituting the ferrimagnetic film 42. An artificial lattice film, in which Er, Fe, and Co are multilayered, may be used for the ferrimagnetic film 42. In such a structure, the anisotropy is large in the direction parallel to the substrate surface, and such a structure is thermally stable.

Formation of Non-Magnetic Intermediate Film

Subsequently, an MgO film was formed as the non-magnetic intermediate film 43 on the ferrimagnetic film 42 by means of the electron cyclotron resonance (ECR) sputtering method to utilize the resonance absorption based on the microwave. The non-magnetic intermediate film 43 is capable of not only controlling the magnetic coupling force between the ferrimagnetic film 42 and the information-recording film 44 but also controlling the crystalline orientation and the crystal grain diameter of the information-recording film 44 formed on the non-magnetic intermediate film 43. MgO was used for the sputtering target, and high purity Ar gas was used for the electric discharge gas. The pressure during the sputtering was 0.3 mTorr (about 39.9 mPa), and the introduced microwave electric power was 0.7 kW. An RF bias of 500 W was applied in order to draw the plasma excited by the microwave. The film was formed at room temperature during the sputtering without heating the substrate.

Formation of Information-Recording Film

Subsequently, a $Co_{69}Cr_{18}Pt_{10}Ta_3$ film was formed to have a film thickness of 10 nm as the information-recording film 44 on the non-magnetic intermediate film 43 by means of the DC sputtering method. The substrate was heated to 150° C. during the film formation of the information-recording film 44. A Co—Cr—Pt—Ta alloy was used for the sputtering target, and pure Ar was used for the electric discharge gas. The pressure during the sputtering was 3 mTorr, and the introduced DC electric power was 1 kW/150 mmφ.

Subsequently, the magnetic characteristics of the information-recording film 44 were investigated in a single film state. The obtained magnetic characteristics were as follows. That is, the coercivity was 3.0 kOe (about 238.74 kA/m), and Isv was 3×10$^{-6}$ emu. S as the index of the rectangularity of the hysteresis in the M-H loop was 0.83, and S$^+$ was 0.86. The information-recording film 44 had the good magnetic characteristics. The reason, why the index to indicate the rectangularity is large (approximate to the rectangle), is that the interaction is reduced between the magnetic crystal grains of the magnetic material for constituting the information-recording film 44. The value of the saturation magnetization of the information-recording film 44 was 350 emu/ml. Both of the ferrimagnetic film (first magnetic film) 42 and the information-recording film (second magnetic film) 44 were in-plane magnetizable films in each of which the easy axis of magnetization was directed in the direction parallel to the substrate surface.

Formation of Protective Film

Finally, a C (carbon) film was formed as the protective film 45 to have a film thickness of 5 nm. The protective film 45 was formed by using the ECR sputtering method to utilize the resonance absorption based on the microwave. The pressure during the sputtering was 0.3 mTorr, and the introduced microwave electric power was 0.7 kW. A DC bias voltage of 500 V was applied in order to draw the plasma excited by the microwave.

Thus, the in-plane magnetic recording medium 40 having the stacked structure as shown in FIG. 9 was manufactured.

Subsequently, a lubricant was applied onto the protective film of the magnetic recording medium to manufacture a plurality of magnetic disks in the same manner as in the first embodiment. The plurality of obtained magnetic disks were coaxially incorporated into a magnetic recording apparatus. The arrangement of the magnetic recording apparatus was the same as that used in the first embodiment except that a magnetic head for the in-plane recording was used as the recording magnetic head. The magnetic recording apparatus had a structure as shown in FIGS. 2(A) and 2(B).

Figure 10:
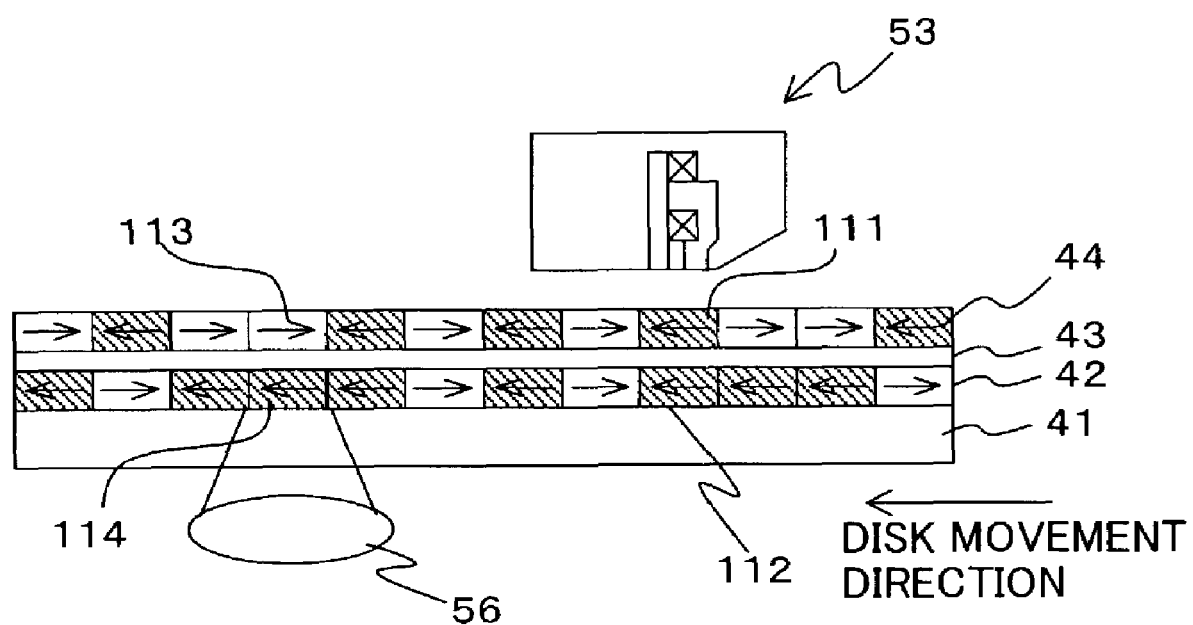
FIG. 10 conceptually explains the recording principle on an in-plane magnetic recording medium.

An explanation will now be made with reference to FIG. 10 about the principle of recording on the in-plane magnetic recording medium of this embodiment. It is assumed that the magnetic recording medium is moved in the leftward direction indicated in FIG. 10 with respect to an objective lens 56 and the magnetic head 53.

When the magnetic head 53 is allowed to travel over the magnetic recording medium, and the magnetic field having the polarity corresponding to the recording information is applied from the magnetic head 53 to the magnetic recording medium, then a magnetic domain 111 having the polarity corresponding to the recording information is formed in the second magnetic film 44. On the other hand, a magnetic domain 112 of the previous recorded information is still formed in the first magnetic film 42 irrelevant to the polarity of the magnetic field applied from the magnetic head 53, because the first magnetic film 42 has the high coercivity at room temperature.

When the area (information-recorded area) of the magnetic recording medium, in which the information has been recorded, is moved to a position just over the objective lens 56, the information-recorded area is heated by the converging laser beam radiated from the objective lens 56. In this procedure, the laser beam from the objective lens 56 is radiated so that the laser beam is collected (focuses) on the first magnetic film 42. The coercivity of the first magnetic film 42 in the information-recorded area is lowered by being heated by the irradiation with the laser beam. As a result, the intensity of the leak magnetic field from the magnetic domain 113 of the second magnetic film 44 acts more intensely than the coercivity of the first magnetic film 42, and a magnetic domain 114, which has the polarity opposite to that of the magnetic domain 113 of the second magnetic film 44, is formed in the first magnetic film 42. That is, the information, which has been recorded in the second magnetic film 44, is recorded in a state of reverse magnetization in the first magnetic film 42 by the aid of the objective lens 56 of the optical head. The temperature of the first magnetic film is in the vicinity of the room temperature after being irradiated with the laser beam. Therefore, the saturation magnetization of the first magnetic film is lowered, and the coercivity thereof is raised. Accordingly, the first magnetic film, which has been irradiated with the laser beam, is stabilized while retaining the information in the state of reverse magnetization with respect to the information recorded in the second magnetic film. Thus, the information is recorded on the information-recording medium.

An environmental test was performed in order to investigate the thermal stability of the magnetic disk. In the environmental test, the magnetic recording apparatus was operated to record a signal corresponding to 50 Gbits/inch$^2$ (about 7.75 Gbits/cm$^2$) on the magnetic disk. The magnetic disk was left to stand in an environment at 80° C. for not less than 1000 hours, and then the recorded signal was reproduced. As a result, the decrease in output was not more than 3% as compared with the reproduced signal output obtained before the environmental test. As described above, the magnetic disk of this embodiment successfully improved the thermal stability to the great extent as well. The error rate or defect rate of the disk was measured. As a result, a value of not more than 1×10$^{-5}$ was obtained when the signal processing was not performed.

The information-recording medium, the information-recording apparatus, and the recording method according to the present invention have been explained above as exemplified by the embodiments. However, the present invention is not limited thereto, which may include various modified embodiments and improved embodiments.

For example, in the first and second embodiments, the magnetic material based on Co—Cr—Pt was used for the information-recording film (second magnetic film). However, a magnetic film having equivalent characteristics can be obtained even when Pd is used in place of Pt. At least one element or two elements selected from Ta, Nb, V, and Ti may be added to the three-component-based magnetic film as described above. Such an element has an effect to facilitate the segregation of Cr in the vicinity of the crystal grain boundary of Co. Accordingly, it is possible to reduce the magnetic interaction between the magnetic crystal grains, which is preferred for the high density recording. Further, B or Si may be contained. In this case, the formation of fine and minute Co crystal grains is facilitated, and the segregation of Cr is facilitated.

MgO was used as the non-magnetic intermediate film. However, an arbitrary material can be used provided that the material exhibits non-magnetization, which may be either an inorganic compound or a metal. However, when the high density recording is performed by using the crystalline material for the second magnetic film, it is desirable that the orientation is effected in (112$^-$0) of Co ("2$^-$" herein means 2 affixed with upper bar) in this case, because it is necessary to control the orientation of the second magnetic film. The MgO film is extremely effective to control the orientation as described above.

Other than MgO, it is also allowable to use an intermediate film having a structure in which an amorphous substance such as $SiO_2$, $TiO_2$, $Ta_2O_5$, and ZnO is formed around (in the grain boundary of) crystal grains such as those of CoO, $Co_3O_4$, and NiO having a grain diameter size of about 10 nm. When such an intermediate film is used, an effect is obtained such that the crystal grains such as those of CoO, $Co_3O_4$, and NiO control the orientation of the magnetic film. In the intermediate film composed of the material as described above, the difference in film structure appears between the amorphous portion and the crystalline portion. As for the cross-sectional structure of the film, the crystalline portion has a columnar or prism-shaped structure, and the amorphous portion has a three-dimensional random structure. The difference in crystallinity and structure of the intermediate film brings about the difference in magnetic characteristics of the magnetic film to be formed on the intermediate film. Therefore, the magnetic interaction between the magnetic grains of the magnetic film is reduced, and it is possible to record the information in the magnetic film at a high density. For example, an alloy based on Ni—Al (B2structure), an alloy based on Cr—X (for example, X=Mo, Ti, Ta, W, Nb, and V), and an alloy based on Co—Cr—Ru, which serve as a metal in which the magnetic film based on Co—Cr is easily grown, may be used for the intermediate film.

In the first to third embodiments, Tb—Fe—Co was used as the material for constituting the ferrimagnetic film (first magnetic film). However, there is no limitation to this material. An arbitrary material may be used provided that the material is a ferrimagnetic substance having the perpendicular magnetic anisotropy. For example, when a metal, which is composed of the rare earth element and the iron family element, is used as the ferrimagnetic substance, then it is preferable to use at least one element selected from Tb, Dy, Ho, and Gd as the rare earth element, and it is preferable to use at least one element selected from Fe, Co, and Ni as the iron family element. Further, for example, a Co/Pt (or Pd) artificial lattice film may be used for the first magnetic film.

In the fourth embodiment, the ferrimagnetic substance based on the rare earth element-iron family element of Er—Fe—Co was used as the material for constituting the ferrimagnetic film (first magnetic film). However, there is no limitation thereto. The ferrimagnetic film (first magnetic film) can be constituted by using an arbitrary material provided that the material is a ferrimagnetic substance having the in-plane magnetization. For example, in the case of the ferrimagnetic substance based on the rare earth element-iron family element, it is preferable to use at least one element selected from Tm, Nd, Pr, Tb, Dy, Ho, Gd, and Sm as the rare earth element, and it is preferable to use at least one element selected from Fe, Co, and Ni as the iron family element.

In the magnetic recording medium of the fourth embodiment, the intermediate film was formed between the first magnetic film and the second magnetic film. Therefore, the information in the second magnetic film was transferred to the first magnetic film by magnetizing the magnetic domain in the first magnetic film in the direction opposite to that of the magnetic domain in the second magnetic film by the aid of the leak magnetic field from the magnetic domain formed in the second magnetic film when the laser beam was radiated. However, when the first magnetic film and the second magnetic film are formed in contact with each other without providing the intermediate film, the first magnetic film and the second magnetic film are subjected to the exchange coupling. Therefore, the information in the second magnetic film is transferred to the first magnetic film by magnetizing the magnetic domain in the first magnetic film in the same direction as that of the magnetic domain in the second magnetic film.

In the embodiment described above, both of the first magnetic film (ferrimagnetic film) and the second magnetic film (information-recording film) were constituted by using the magnetic films in each of which the direction of the easy axis of magnetization is identical. However, the first magnetic film (ferrimagnetic film) and the second magnetic film (information-recording film) may be constructed by using magnetic films in which the directions of easy axes of magnetization are different from each other. That is, a perpendicularly magnetizable film may be used for the first magnetic film, and an in-plane magnetizable film may be used for the second magnetic film. Alternatively, an in-plane magnetizable film may be used for the first magnetic film, and a perpendicularly magnetizable film may be used for the second magnetic film.

INDUSTRIAL APPLICABILITY

In the recording method of the present invention, the information recorded in the second magnetic film is magnetically transferred to the first magnetic film by radiating the laser beam onto the area in which the information has been recorded, after recording the information in the second magnetic film of the information-recording medium. Therefore, it is possible to record the information in the first magnetic film and the second magnetic film reliably and stably.

In the information-recording apparatus of the present invention, the information-recording medium is moved relative to the magnetic head and the optical head, and the area, in which the information has been already recorded by the magnetic head, can be subjected to the scanning with the optical head to irradiate the area with the laser beam. Therefore, the information-recording apparatus of the present invention is preferred as the recording apparatus for realizing the recording method of the present invention.

The information-recording medium of the present invention can be constructed to include, for example, the first magnetic film which is constituted by using the ferrimagnetic substance excellent in thermal stability, and the second magnetic film which is constituted by using the hard magnetic material preferred to record and reproduce the information. The information is recorded in the second magnetic film by the aid of the magnetic head, and then the area, in which the information has been recorded, is irradiated with the laser beam to magnetically transfer the information in the second magnetic film to the first magnetic film. Accordingly, the information recorded in the second magnetic film is stably retained by the first magnetic film. Therefore, the information-recording medium of the present invention is extremely resistant to the thermal fluctuation and the thermal demagnetization, and it has the high reliability. It is possible to record the information thereon at the recording density of not less than 50 Gbits/inch$^2$ (about 7.75 Gbits/cm$^2$).

The invention claimed is:

1. A recording method for an information-recording medium comprising a first magnetic film and a second magnetic film, the recording method comprising:

moving the information-recording medium relative to an applied magnetic field and a laser beam; and applying a magnetic field to the information-recording medium to record information in the second magnetic film, while irradiating, with a laser beam, an area in which the information has been recorded to record the information recorded in the second magnetic film to the first magnetic film by transferring magnetically the information from the second magnetic film to the first magnetic film, wherein a thermal stability of the first magnetic film is higher than that of the second magnetic film.

2. A recording method for an information-recording medium comprising a first magnetic film and a second magnetic film, the recording method comprising:

applying a magnetic field to the information-recording medium to record a certain amount of information in the second magnetic film; and irradiating with a laser beam, an area in which the information has been recorded after completion of the recording of the certain amount of information to record the information recorded in the second magnetic film to the first magnetic film by transferring magnetically the information from the second magnetic film to the first magnetic film, wherein a thermal stability of the first magnetic film is higher than that of the second magnetic film.

3. The recording method according to claim 1, wherein the first magnetic film is composed of a ferrimagnetic material, and the second magnetic film is composed of an alloy principally containing Co—Cr.

4. The recording method according to claim 1, wherein the first and second magnetic films are formed so that the second magnetic film is positioned on a side of the applied magnetic field with respect to the first magnetic film in the information-recording medium.

5. The recording method according to claim 1, wherein the information-recording medium further comprises a substrate on which the first magnetic film and the second magnetic film are formed, and the first magnetic film and the second magnetic film have easy axes of magnetization in a direction perpendicular to a substrate surface.

6. The recording method according to claim 5, wherein the first magnetic film is composed of an alloy comprising an iron family element and a rare earth element, the iron family element is at least one element selected from the group consisting of Fe, Co, and Ni, and the rare earth element is at least one element selected from the group consisting of Tb, Gd, Dy, and Ho.

7. The recording method according to claim 3, wherein the crystalline alloy principally containing Co—Cr further contains at least one element selected from the group consisting of Pt, Pd, Ta, Nb, Si, V, B, and Ti.

8. The recording method according to claim 1, wherein the information-recording medium further comprises a substrate on which the first magnetic film and the second magnetic film are formed, and the first magnetic film and the second magnetic film have easy axes of magnetization in a direction parallel to a substrate surface.

9. The recording method according to claim 8, wherein the first magnetic film is composed of an alloy comprising an iron family element and a rare earth element, the rare earth element is at least one element selected from the group consisting of Er, Tm, Nd, Pr, Tb, Dy, Ho, Gd, and Sm, and the iron family element is at least one element selected from the group consisting of Fe, Co, and Ni.

10. The recording method according to claim 5, wherein the information-recording medium further comprises an intermediate film which is provided between the first magnetic film and the second magnetic film.

11. The recording method according to claim 8, wherein the information-recording medium further comprises a non-magnetic intermediate film which is provided between the first magnetic film and the second magnetic film, and a magnetic domain, which has magnetization directed opposite to magnetization of a magnetic domain corresponding to the information recorded in the second magnetic film, is formed in the first magnetic film by being irradiated with the laser beam.

12. The recording method according to claim 10, wherein the intermediate film is-composed of a non-magnetic material comprising crystal grains of oxide of at least one element selected from the group consisting of Mg, Co, and Ni, or a non-magnetic material composed of the crystal grains and an amorphous phase which surrounds the crystal grains and which comprises oxide of at least one element selected from the group consisting of Si, Zn, Ti, Ta, and Al.

13. The recording method according to claim 10, wherein the intermediate film is composed of a soft magnetic material.

14. The recording method according to claim 1, wherein the laser beam is radiated to focus on the first magnetic film.

15. The recording method according to claim 1, wherein a coercivity of the first magnetic film is larger than a coercivity of the second magnetic film at room temperature.

16. The recording method according to claim 1, wherein a coercivity of which the first magnetic film is heated to a predetermined temperature by irradiation with the laser beam, is smaller than a coercivity of the second magnetic film.

17. The recording method according to claim 8, wherein the information-recording medium further comprises an intermediate film which is provided between the first magnetic film and the second magnetic film.

* * * * *